United States Patent
Ryu et al.

(10) Patent No.: US 9,405,156 B2
(45) Date of Patent: Aug. 2, 2016

(54) LIQUID CRYSTAL DISPLAY AND MANUFACTURING METHOD THEREOF

(71) Applicant: Samsung Display Co., Ltd., Yongin, Gyeonggi-Do (KR)

(72) Inventors: Yong-Hwan Ryu, Yongin-si (KR); Sang Gab Kim, Seoul (KR); Hong Sick Park, Suwon-si (KR); Jung Ha Son, Seoul (KR); Shin Il Choi, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 100 days.

(21) Appl. No.: 13/938,106

(22) Filed: Jul. 9, 2013

(65) Prior Publication Data

US 2014/0139795 A1    May 22, 2014

(30) Foreign Application Priority Data

Nov. 21, 2012   (KR) .................. 10-2012-0132573

(51) Int. Cl.
    *G02F 1/1341*     (2006.01)
    *G02F 1/1333*     (2006.01)

(52) U.S. Cl.
    CPC ........ *G02F 1/1341* (2013.01); *G02F 1/133345* (2013.01)

(58) Field of Classification Search
    CPC .................................................. G02F 1/1339
    See application file for complete search history.

(56) References Cited

U.S. PATENT DOCUMENTS

| | | | |
|---|---|---|---|
| 6,141,072 A | 10/2000 | Drabik et al. | |
| 6,469,761 B1 | 10/2002 | Drabik et al. | |
| 6,912,038 B2 | 6/2005 | Liao et al. | |
| 7,123,319 B2 | 10/2006 | Broer et al. | |
| 8,007,334 B2 | 8/2011 | Tohyama et al. | |
| 2003/0214620 A1* | 11/2003 | Kim et al. | .................. 349/155 |
| 2005/0140890 A1* | 6/2005 | Kim | ............ G02F 1/133305 349/139 |
| 2006/0102477 A1* | 5/2006 | Vann et al. | .................. 204/450 |
| 2006/0170835 A1* | 8/2006 | Jun | ............... G02F 1/136213 349/38 |
| 2009/0236627 A1* | 9/2009 | Kim et al. | ..................... 257/99 |
| 2010/0118253 A1* | 5/2010 | Lu et al. | .................... 349/153 |
| 2010/0157413 A1* | 6/2010 | Dean | ............... H04M 1/0283 359/316 |
| 2012/0062448 A1* | 3/2012 | Kim et al. | ..................... 345/55 |
| 2012/0146984 A1* | 6/2012 | Ku | ................... G02B 26/005 345/212 |

FOREIGN PATENT DOCUMENTS

| | | |
|---|---|---|
| JP | 2000-330130 | 11/2000 |
| JP | 2005-004090 | 1/2005 |
| KR | 10-0389889 | 6/2003 |
| KR | 10-2003-0063656 | 7/2003 |
| KR | 10-2012-0026880 | 3/2012 |

\* cited by examiner

*Primary Examiner* — Dung Nguyen
*Assistant Examiner* — Shan Liu
(74) *Attorney, Agent, or Firm* — Innovation Counsel LLP

(57) ABSTRACT

A liquid crystal display is provided. The liquid crystal display includes a substrate, a thin film transistor disposed on the substrate, a pixel electrode connected with a terminal of the thin film transistor, a microcavity disposed on the pixel electrode, the microcavity including a liquid crystal injection hole disposed at an edge of the microcavity, a supporting member disposed on the microcavity, a first hydrophobic layer disposed on an edge portion of the supporting member, and a capping layer disposed on the supporting member with the capping layer covering the liquid crystal injection hole.

9 Claims, 14 Drawing Sheets

LIQUID CRYSTAL DISPLAY AND MANUFACTURING METHOD THEREOF

CROSS-REFERENCE TO RELATED APPLICATION

This application claims priority to and the benefit of Korean Patent Application No. 10-2012-0132573 filed in the Korean Intellectual Property Office on Nov. 21, 2012, the entire contents of which are incorporated herein by reference.

BACKGROUND (a) Technical Field

The present invention relates to a liquid crystal display and a manufacturing method thereof.

(b) Description of the Related Art

A liquid crystal display is commonly used in flat panel displays. The liquid crystal display may include two sheets of panels having field generating electrodes (e.g., pixel electrodes, common electrodes, or other types of electrodes) and a liquid crystal layer interposed therebetween.

When a voltage is applied to the field generating electrodes, an electric field is generated in the liquid crystal layer. The electric field determines the direction of liquid crystal molecules in the liquid crystal layer and controls polarization of incident light, so as to provide images on the liquid crystal display.

A nano crystal display (NCD) is a type of liquid crystal display. An NCD may be manufactured by forming a sacrificial layer (e.g., an organic material) on a substrate, forming a supporting member on the sacrificial layer, removing the sacrificial layer to form a cavity beneath the supporting member, and injecting liquid crystal material into the cavity.

Before injecting the liquid crystal material into the cavity, an aligning agent may be applied to the cavity in order to facilitate the arrangement and alignment of liquid crystal molecules in the cavity. After the aligning agent is applied to the cavity, drying may be required to drive out the solvent components in the aligning agent. However, in the process of drying the aligning agent, solids in the aligning agent may coalesce to form large clusters of solids in the cavity (or at the opening of the cavity). The large clusters of solids can obstruct the flow of the liquid crystal material into the cavity, and impact the arrangement and alignment of liquid crystal molecules in the cavity. As a result, the liquid crystal display may have defects arising from light leakage or transmittance deterioration.

SUMMARY

The present disclosure is directed to address at least the above problems relating to the flow of a liquid crystal material in a liquid crystal display.

According to an embodiment of the inventive concept, a liquid crystal display is provided. The liquid crystal display includes a substrate, a thin film transistor disposed on the substrate, a pixel electrode connected with a terminal of the thin film transistor, a microcavity disposed on the pixel electrode, the microcavity including a liquid crystal injection hole disposed at an edge of the microcavity, a supporting member disposed on the microcavity, a first hydrophobic layer disposed on an edge portion of the supporting member, and a capping layer disposed on the supporting member with the capping layer covering the liquid crystal injection hole.

In some embodiments, the liquid crystal display may include a second hydrophobic layer disposed between adjacent microcavities.

In some embodiments, the microcavity may include a plurality of regions, and the liquid crystal display may include a groove formed between adjacent regions, with the capping layer covering the groove.

In some embodiments, the second hydrophobic layer and the capping layer may be disposed in contact with each other in the groove.

In some embodiments, the first hydrophobic layer may include a first portion disposed at a top surface of the supporting member and a second portion extending from the first portion, with the second portion disposed on a surface of the supporting member along a lateral surface of the groove.

In some embodiments, the liquid crystal display may include an organic layer disposed on portions of the substrate, and a light blocking member disposed between adjacent organic layers, wherein the second hydrophobic layer is disposed on a portion of the light blocking member.

In some embodiments, the liquid crystal display may include a common electrode disposed on the microcavity.

In some embodiments, a surface of the pixel electrode surrounding the microcavity and a surface of the common electrode may have a hydrophilic property as a result of being subjected to hydrophilic processing.

In some embodiments, the liquid crystal display may include an alignment layer disposed between the pixel electrode and the microcavity, or between the common electrode and the microcavity.

In some embodiments, the microcavity may include a liquid crystal material.

In some embodiments, the first hydrophobic layer may include carbon, hydrogen, or fluorine.

According to another embodiment of the inventive concept, a method of manufacturing a liquid crystal display is provided. The method includes forming a thin film transistor on a substrate, forming a pixel electrode on the thin film transistor is formed, forming a sacrificial layer on the pixel electrode, forming a supporting member on the sacrificial layer, forming a microcavity by removing the sacrificial layer, wherein the microcavity includes a liquid crystal injection hole formed at an edge of the microcavity, forming a first hydrophobic layer on an edge portion of the supporting member, injecting a liquid crystal material into the microcavity, and forming a capping layer on the supporting member so as to cover the liquid crystal injection hole.

In some embodiments, the method may include forming a second hydrophobic layer between adjacent microcavities.

In some embodiments, the microcavity may include a plurality of regions, and the method may include forming a groove between adjacent regions, with the capping layer covering the groove.

In some embodiments, the method may include forming the second hydrophobic layer and the capping layer in contact with each other in the groove.

In some embodiments, forming the first hydrophobic layer may include forming a first portion disposed at a top surface of the supporting member and forming a second portion extending from the first portion, with the second portion disposed on a surface of the supporting member along a lateral surface of the groove.

In some embodiments, the method may include forming an organic layer on portions of the substrate, and forming a light blocking member between adjacent organic layers, wherein the second hydrophobic layer is formed on a portion of the light blocking member.

In some embodiments, the method may include forming a common electrode on the sacrificial layer.

In some embodiments, the method may include performing hydrophilic processing on a surface of the pixel electrode surrounding the microcavity and on a surface of the common electrode.

In some embodiments, the method may include forming an alignment layer between the pixel electrode and the microcavity, or between the common electrode and the microcavity.

DETAILED DESCRIPTION

Figure 1:
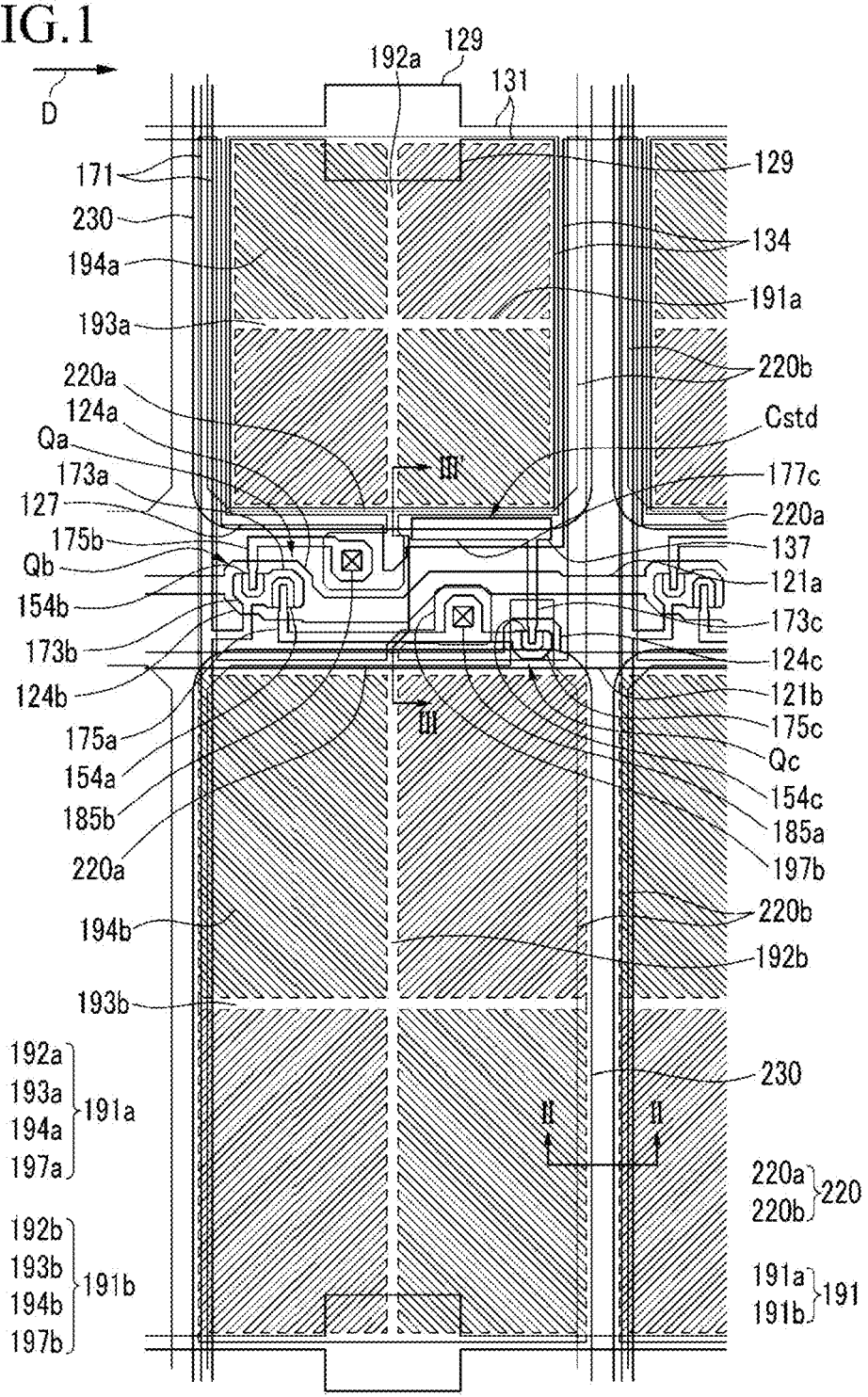
FIG. 1 is a plan view illustrating a liquid crystal display according to an exemplary embodiment of the inventive concept.

Hereinafter, embodiments of the inventive concept will be described in detail with reference to the accompanying drawings. As those skilled in the art would realize, the described embodiments may be modified in various different ways without departing from the spirit or scope of the inventive concept.

In the drawings, the thickness of layers, films, panels, regions, etc., may have been exaggerated for clarity. It will be understood that when a layer is referred to as being "on" another layer or substrate, it can be formed directly on the other layer or substrate, or formed on the other layer or substrate with one or more intervening layers therebetween. Like reference numerals designate like elements throughout the specification.

Figure 2:
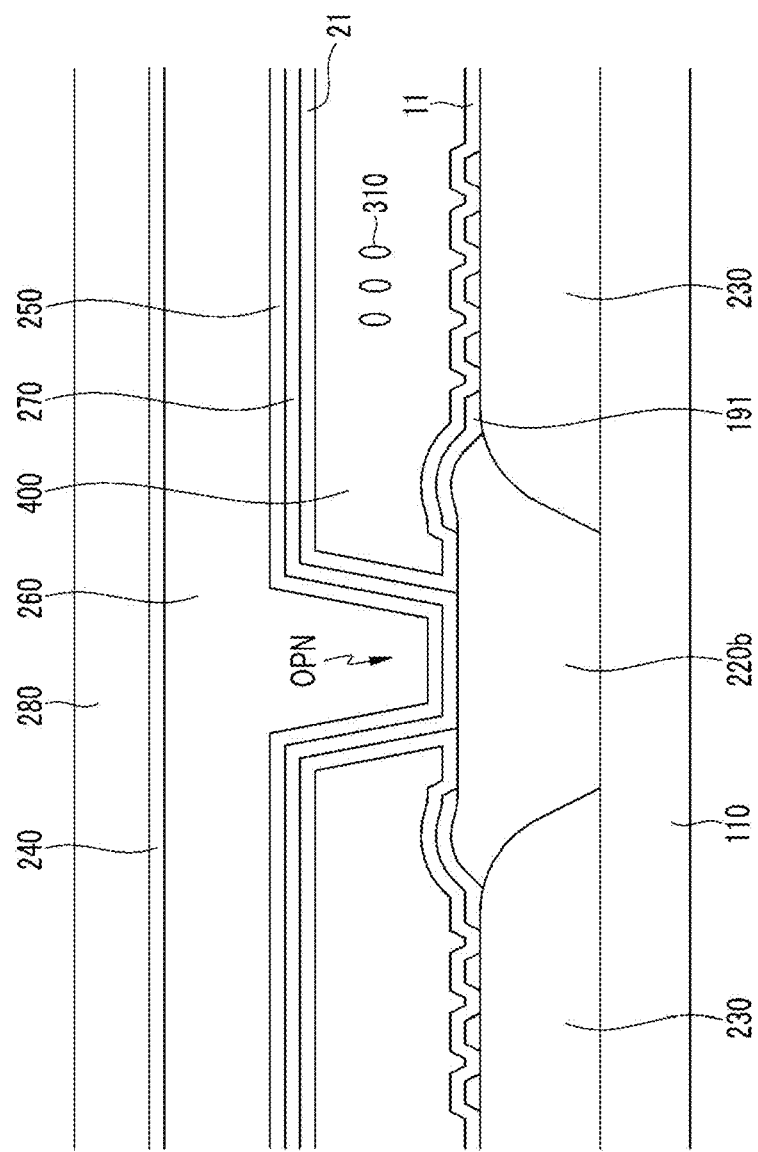
FIG. 2 is a cross-sectional view taken along line II-II of FIG. 1.
Figure 3:
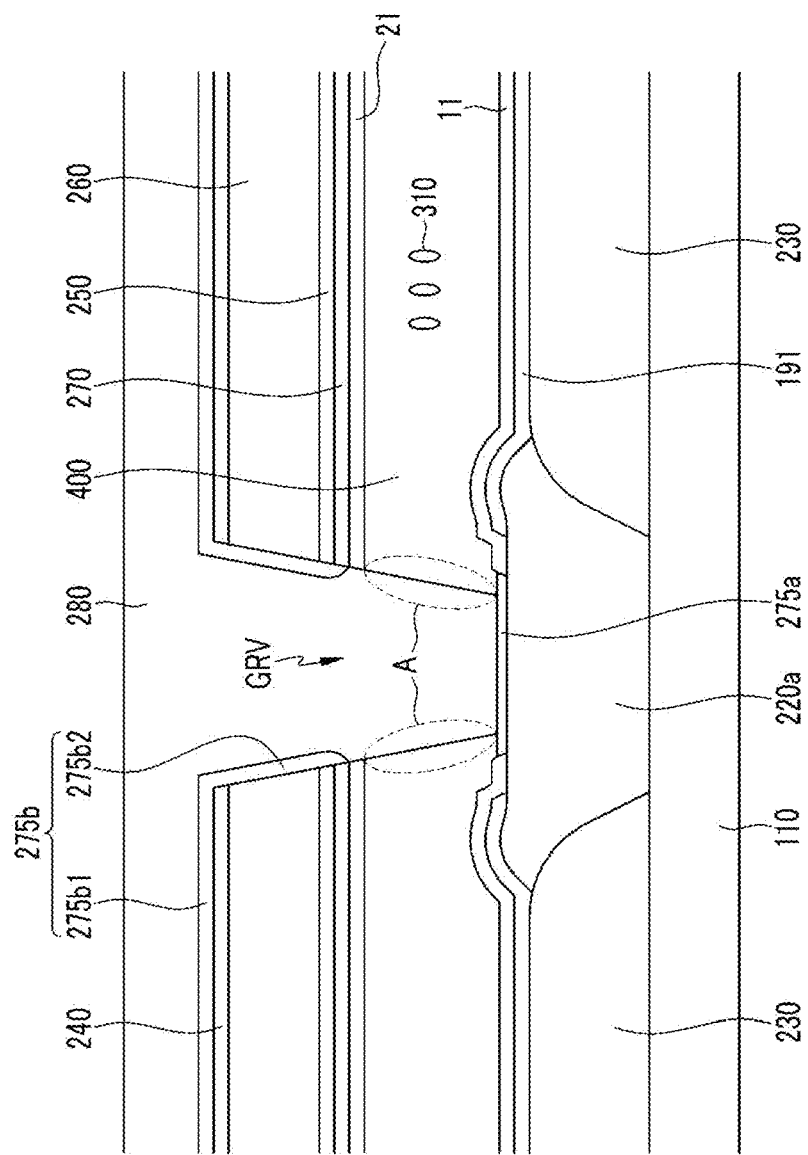
FIG. 3 is a cross-sectional view taken along line III-III of FIG. 1.
Figure 4:
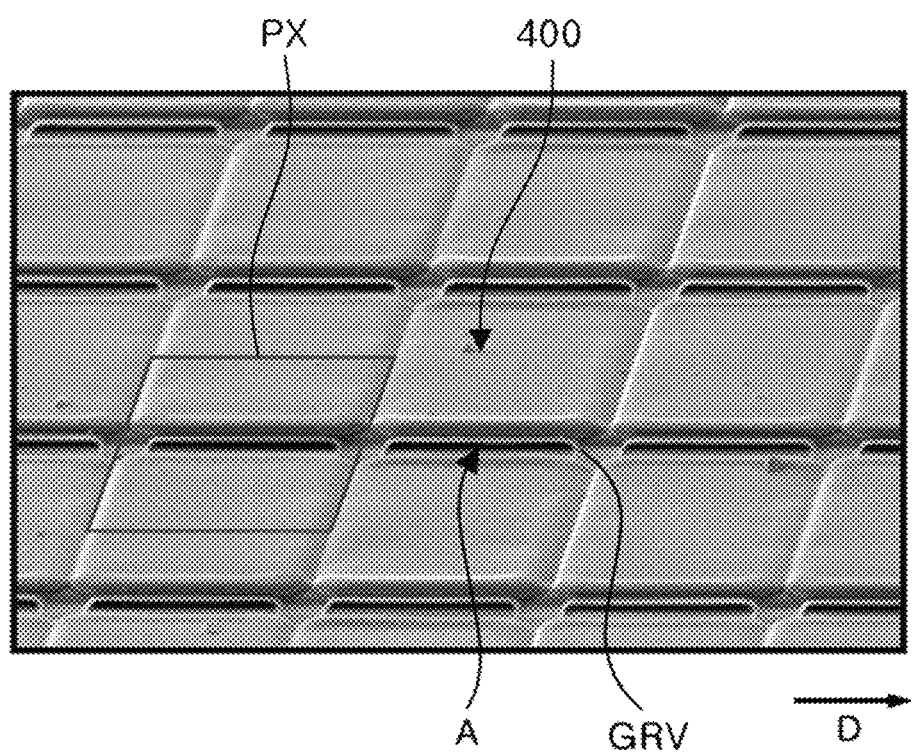
FIG. 4 is a perspective view illustrating a microcavity according to the exemplary embodiment of FIGS. 1 to 3.

FIG. 1 is a plan view illustrating a liquid crystal display according to an exemplary embodiment of the inventive concept. FIG. 2 is a cross-sectional view taken along line II-II of FIG. 1. FIG. 3 is a cross-sectional view taken along line III-III of FIG. 1. FIG. 4 is a perspective view illustrating a microcavity according to the exemplary embodiment of FIGS. 1 to 3.

Referring to FIGS. 1 to 3, the liquid crystal display includes thin film transistors Qa, Qb, and Qc formed on a substrate 110. The substrate 110 may be formed of transparent glass or plastic.

As shown in FIGS. 2 and 3, an organic layer 230 is formed on portions of the substrate 110 (where the thin film transistors Qa, Qb, and Qc are formed). A light blocking member 220 (e.g., horizontal light blocking member 220a or vertical light blocking member 220b) is formed on the substrate 110 between adjacent organic layers 230. A pixel electrode 191 is formed on portions of the organic layer 230 and the light blocking member 220. Referring to FIG. 1, the pixel electrode 191 is electrically connected to a terminal of each of the thin film transistors Qa and Qb via respective contact holes 185a and 185b. In some embodiments, the organic layer 230 may be formed being elongated in a column direction of the pixel electrode 191.

In some embodiments, the organic layer 230 may serve as a color filter. A color filter may display one or more of the three primary colors (red, green, and blue). The color filter is not limited to the three primary colors, and may also display one of cyan, magenta, yellow, and white-based colors.

Referring to FIG. 1, adjacent organic layers 230 may be spaced apart from each other in a horizontal direction D and in a vertical direction that is perpendicular to the horizontal direction D. FIG. 2 depicts a section of the liquid crystal display in which adjacent organic layers 230 are spaced apart from each other in the horizontal direction D. FIG. 3 depicts a section of the liquid crystal display in which adjacent organic layers 230 are spaced apart from each other in the vertical direction.

Referring to FIG. 2, a vertical light blocking member 220b is formed on the substrate 110 between the adjacent organic layers 230 (which are spaced apart from each other in the horizontal direction D). As shown in FIG. 2, the vertical light blocking member 220b is formed overlapping the edges of the adjacent organic layers 230. In some embodiments, an overlapping width between the vertical light blocking member 220b and the adjacent organic layers 230 may be substantially the same on opposite edges of the adjacent organic layers 230.

Referring to FIG. 3, a horizontal light blocking member 220a is formed on the substrate 110 between the adjacent organic layers 230 (which are spaced apart from each other in the vertical direction). As shown in FIG. 3, the horizontal light blocking member 220a is formed overlapping the edges of the adjacent organic layers 230. In some embodiments, an overlapping width between the horizontal light blocking member 220a and the adjacent organic layers 230 may be substantially the same on opposite edges of the adjacent organic layers 230.

As shown in FIGS. 2 and 3, a lower alignment layer 11 is formed on the pixel electrode 191. The lower alignment layer 11 may serve as a vertical alignment layer. The lower alignment layer 11 may be formed of materials which are generally used as a liquid crystal alignment layer, such as polyamic acid, polysiloxane, or polyimide.

As shown in FIGS. 2 and 3, a microcavity 400 is formed bounded by the lower alignment layer 11 and an upper alignment layer 21. The microcavity 400 may be formed in a column direction (i.e., vertical direction) of the pixel electrode 191.

Referring to FIG. 3, the microcavity 400 has a liquid crystal injection hole A formed at an edge of the microcavity 400. A liquid crystal material including liquid crystal molecules 310 can be injected into the microcavity 400 through the liquid crystal injection hole 400. In some embodiments, the liquid crystal material including the liquid crystal molecules 310 may flow through the liquid crystal injection hole 400 into the microcavity 400 via capillary action (capillary force).

In some embodiments, a hydrophobic layer is formed between adjacent microcavities 400. For example, as shown in FIG. 3, a first hydrophobic layer 275a is formed on a portion of the horizontal light blocking member 220a between the adjacent microcavities 400. The first hydrophobic layer 275a may contain elements such as carbon, hydrogen, or fluorine. The first hydrophobic layer 275a may prevent liquid crystal material from dispersing when the liquid crystal material is first dispensed (or injected) near the liquid crystal injection hole A. Specifically, a hydrophobic property of the first hydrophobic layer 275a allows the liquid crystal molecules 310 in the liquid crystal material to maintain their original shapes when the liquid crystal material is flowing on the first hydrophobic layer 275a.

As shown in FIGS. 2 and 3, a common electrode 270 is formed on the upper alignment layer 21, and an overcoat 250 is formed on the common electrode 270. A common voltage may be applied to the common electrode 270, while a data voltage may be applied to the pixel electrode 191. Together, the common electrode 270 and the pixel electrode 191 may generate an electric field that determines the orientation of the liquid crystal molecules 310 (located in the microcavity 400 between the two electrodes 270 and 191). Also, the common electrode 270 and the pixel electrode 191 collectively constitute a capacitor that can maintain an applied voltage even after the thin film transistor (e.g., Qa, Qb, or Qc) has been turned off. The overcoat 250 may be formed of silicon nitride (SiNx) or silicon oxide (SiO2).

As shown in FIGS. 2 and 3, a supporting member 260 is formed on the overcoat 250. The supporting member 260 may include silicon oxycarbide (SiOC), a photoresist, or other organic materials. In some embodiments, a supporting member 260 including photoresist may be formed using a coating method. In some preferred embodiments, a supporting member 260 including silicon oxycarbide (SiOC) may be formed using a chemical vapor deposition (CVD) method. The CVD method can produce silicon oxycarbide (SiOC) layers having high transmittance, low layer stress, and low layer deformation.

Referring to FIG. 3, a groove GRV may be formed between the adjacent microcavities 400. In some embodiments, the groove GRV may be formed passing through a microcavity 400, the upper alignment layer 21, the common electrode 270, the overcoat 250, and the supporting member 260.

Next, the microcavity 400 will be described in detail with reference to FIGS. 2 to 4.

Referring to FIGS. 2 to 4, the microcavity 400 is divided by a plurality of grooves GRV (positioned at a portion overlapping with a gate line 121*a*) into a plurality of regions extending in the direction D of the gate line 121*a*. The plurality of regions of the microcavity 400 may correspond to a plurality of pixel areas on the liquid crystal display.

A plurality of regions of the microcavity 400 formed in the vertical direction is referred to as a group. When a plurality of groups is formed in a row direction, the grooves GRV dividing the microcavity 400 may be positioned extending in the direction D of the gate line 121*a*. As shown in FIG. 3, the liquid crystal injection hole A of the microcavity 400 may be formed in a region corresponding to a boundary between the groove GRV and the microcavity 400.

The liquid crystal injection hole A is formed extending in the direction of the groove GRV. Referring to FIG. 2, an opening OPN may be formed between the adjacent microcavities 400 extending in the direction D of the gate line 121*a*, with the opening OPN covered by the supporting member 260.

As shown in FIG. 3, the liquid crystal injection hole A may be formed at an edge of the microcavity 400 between the upper alignment layer 21 and the horizontal light blocking member 220*a* (or between the upper alignment layer 21 and the lower alignment layer 11).

In some embodiments, the groove GRV may be formed extending in the direction D of the gate line 121*a*. In some other embodiments, the groove GRV may be formed extending in a direction of the data line 171, and a plurality of groups (plurality of regions of the microcavity 400 formed in the vertical direction) may be formed in a column direction. The liquid crystal injection hole A may be formed extending in the direction of the groove GRV (being formed extending in the direction of the data line 171).

Referring to FIGS. 2 and 3, a passivation layer 240 is formed on the supporting member 260. The passivation layer 240 may be formed of silicon nitride (SiNx) or silicon oxide (SiO2). As shown in FIG. 3, a second hydrophobic layer 275*b* is formed on the passivation layer 240. The second hydrophobic layer 275*b* may include a first portion 275*b*1 located above a top surface of the supporting member 260 and a second portion 275*b*2 extending from the first portion 275*b*1, with the second portion 275*b*2 formed along a side surface of the supporting member 260 that is adjacent to the groove GRV. The second hydrophobic layer 275*b* may include elements such as carbon, hydrogen, or fluorine.

The second hydrophobic layer 275*b* can prevent mis-alignment of liquid crystal material in the liquid crystal display. First, the mis-alignment of liquid crystal material will be briefly described.

To allow the liquid crystal material to flow into the microcavity 400 through the liquid crystal injection hole A (e.g., via capillary action), the liquid crystal material is first dispensed (injected) onto the groove GRV. However, if the liquid crystal material is not dispensed accurately at a predetermined position, mis-alignment of the liquid crystal material may occur, resulting in dispersion of the liquid crystal material to surrounding areas. As a result, the liquid crystal material may not flow properly into the microcavity 400. For example, mis-alignment of the liquid crystal material may occur if the liquid crystal material is inaccurately dispensed above a portion of the supporting member 260 located near the groove GRV, or on top of the passivation layer 240.

As mentioned above, the second hydrophobic layer 275*b* can prevent mis-alignment of the liquid crystal material. Specifically, the second hydrophobic layer 275*b* can prevent the liquid crystal material from dispersing to another location, and can aid the flow of the liquid crystal material towards the liquid crystal injection hole A (and microcavity 400). Similar to the first hydrophobic layer 275*a*, a hydrophobic property of the second hydrophobic layer 275*b* allows the liquid crystal molecules 310 in the liquid crystal material to maintain their original shapes when the liquid crystal material is flowing on the second hydrophobic layer 275*b*.

It is noted that the second hydrophobic layer 275*b* need not be formed above the entire top portion of the supporting member 260. In some embodiments, the second hydrophobic layer 275*b* may be formed above a top corner portion of the supporting member 260 which (the top corner portion) is adjacent to the groove GRV where the liquid crystal injection hole A is formed.

As shown in FIG. 3, a capping layer 280 is formed on the second hydrophobic layer 275*b*. The capping layer 280 may be formed covering the first portion 275*b*1 and the second portion 275*b*2 of the second hydrophobic layer 275*b*, with the liquid crystal injection hole A (of the microcavity 400) being exposed through the groove GRV. The capping layer 280 may be formed of a thermosetting resin, silicon oxycarbide (SiOC), or graphene.

In some embodiments, the capping layer 280 is formed of graphene. The graphene layer may serve as a capping layer to cap the liquid crystal injection hole A. Graphene is suitable for use as a capping layer because it is highly impermeable to gases (such as helium). Although the liquid crystal material may contact the graphene layer, the liquid crystal material will not be contaminated because graphene comprises carbon bonds. In addition, the graphene capping layer can protect the liquid crystal material in the microcavity 400 from external oxygen and moisture.

In some embodiments, the liquid crystal display may be formed without having a separate upper substrate (since liquid crystal material is injected through the liquid crystal injection hole A into the microcavity 400).

In some embodiments, an overcoat (not illustrated) may be formed on the capping layer 280. In some embodiments, the overcoat may be formed of an inorganic layer. In other embodiments, the overcoat may be formed of an organic layer. The overcoat can help to protect the liquid crystal molecules 310 (that are injected into the microcavity 400) from external impact. The overcoat also provides a planar layer on top of the capping layer 280.

Next, a liquid crystal display according to an exemplary embodiment will be described with reference to FIGS. 1 to 3.

Referring to FIGS. 1 to 3, a plurality of gate conductors including a plurality of gate lines 121a, a plurality of set-down gate lines 121b, and a plurality of storage electrode lines 131 are formed on the substrate 110 (not illustrated).

The gate lines 121a and the set-down gate lines 121b extend primarily in the horizontal direction D to transfer gate signals to the thin film transistors Qa, Qb, or Qc. A gate line 121a includes a first gate electrode 124a protruding upward and a second gate electrode 124b protruding downward, and a set-down gate line 121b includes a third gate electrode 124c protruding upward. The first gate electrode 124a and the second gate electrode 124b are connected to each other to form a protrusion.

The storage electrode line 131 extends primarily in the horizontal direction D to transfer a predetermined voltage (such as a common voltage Vcom). The storage electrode line 131 includes storage electrodes 129 protruding both upward and downward, a pair of vertical portions 134 extending downward (substantially perpendicular to the gate lines 121a), and a horizontal portion 127 connecting the pair of vertical portions 134. The horizontal portion 127 includes a capacitor electrode 137 extending downward.

In some embodiments, a gate insulating layer (not illustrated) may be formed on the gate lines 121a, set-down gate lines 121b, and storage electrode lines 131.

In some embodiments, a plurality of semiconductor strips (not illustrated) may be formed on the gate insulating layer. The semiconductor strips may be formed of amorphous or crystalline silicon. The semiconductor strips may extend primarily in a vertical direction, and may include first and second semiconductors 154a and 154b extending toward the first and second gate electrodes 124a and 124b, respectively, with the first and second semiconductors 154a/154b connected to each other, and a third semiconductor 154c formed on the third gate electrode 124c.

In some embodiments, a pair of ohmic contacts (not illustrated) may be formed on each of the semiconductors 154a, 154b, and 154c. An ohmic contact may be formed of a material such as n+ hydrogenated amorphous silicon having a high dopant concentration of silicide (or another n-type impurity).

Next, a data conductor including a plurality of data lines 171, a plurality of first drain electrodes 175a, a plurality of second drain electrodes 175b, and a plurality of third drain electrodes 175c may be formed on the pairs of ohmic contacts.

A data line 171 transfers a data signal and extends primarily in a vertical direction to cross a gate line 121a and a set-down gate line 121b. Each data line 171 includes a first source electrode 173a and a second source electrode 173b extending toward the first gate electrode 124a and the second gate electrode 124b, respectively, with the first source electrode 173a and the second source electrode 173b connected to each other.

Each of a first drain electrode 175a, second drain electrode 175b, and third drain electrode 175c includes a wide end and a rod-shaped end. The rod-shaped ends of the first drain electrode 175a and the second drain electrode 175b are partially surrounded by the first source electrode 173a and the second source electrode 173b, respectively. A wide end of the first drain electrode 175a extends to form a third source electrode 173c which is curved in the shape of a letter 'U'. A wide end 177c of the third drain electrode 175c is formed overlapping with the capacitor electrode 137 so as to form a set-down capacitor Cstd. A rod-shaped end of the third drain electrode 175c is partially surrounded by the third source electrode 173c.

The first gate electrode 124a, the first source electrode 173a, and the first drain electrode 175a, together with the first semiconductor 154a, form a first thin film transistor Qa. The second gate electrode 124b, the second source electrode 173b, and the second drain electrode 175b, together with the second semiconductor 154b, form a second thin film transistor Qb. The third gate electrode 124c, the third source electrode 173c, and the third drain electrode 175c, together with the third semiconductor 154c, form a third thin film transistor Qc.

The semiconductor strips including the first semiconductor 154a, the second semiconductor 154b, and the third semiconductor 154c may have substantially the same planar shape as the conductors 171, 173a, 173b, 173c, 175a, 175b, and 175c and the ohmic contacts, with the exception of the channel regions formed between the source electrodes 173a, 173b, and 173c and the drain electrodes 175a, 175b, and 175c.

The first semiconductor 154a includes an exposed portion between the first source electrode 173a and the first drain electrode 175a which is not covered by the first source electrode 173a and the first drain electrode 175a. The second semiconductor 154b includes an exposed portion between the second source electrode 173b and the second drain electrode 175b which is not covered by the second source electrode 173b and the second drain electrode 175b. The third semiconductor 154c includes an exposed portion between the third source electrode 173c and the third drain electrode 175c which is not covered by the third source electrode 173c and the third drain electrode 175c.

A lower passivation layer (not illustrated) may be formed on the conductors 171, 173a, 173b, 173c, 175a, 175b, and 175c and the exposed portions of the semiconductors 154a, 154b, and 154c. The lower passivation layer may be formed of an inorganic insulator such as silicon nitride or silicon oxide.

A color filter (e.g., organic layer 230) may be formed on the lower passivation layer. The color filter may be formed on most regions of the lower passivation layer, except the portions of the lower passivation layer where the first thin film transistor Qa, second thin film transistor Qb, and third thin film transistor Qc are formed. The color filter may be formed being elongated in a vertical direction along a space between adjacent data lines 171. In some embodiments, the color filter may be formed below the pixel electrode 191 and the common electrode 270.

A light blocking member 220 may be formed on the substrate 110 between adjacent color filters (e.g., organic layers 230) and on edge portions of the color filter. The light blocking member 220 may extend upward along the gate line 121a and downward along the set-down gate line 121b. The light blocking member 220 may include a first light blocking member 220a covering the regions where the first thin film transistor Qa, second thin film transistor Qb, and third thin film transistor Qc are formed, and a second light blocking member 220b extending along the data line 171.

The light blocking member 220 is sometimes referred to as a black matrix and may be capable of reducing light leakage.

A plurality of contact holes 185a and 185b exposing the first drain electrode 175a and the second drain electrode 175b, respectively, may be formed in the lower passivation layer and the light blocking member 220.

A pixel electrode 191 (including a first subpixel electrode 191a and a second subpixel electrode 191b) is formed on portions of the color filter and the light blocking member 220. The first subpixel electrode 191a and the second subpixel electrode 191b are separated from each other, with the gate line 121a and set-down gate line 121b therebetween disposed at the upper and lower portions and adjacent to each other in a column direction. A height of the second subpixel electrode 191b may be greater than a height of the first subpixel electrode 191a. In some embodiments, the height of the second subpixel electrode 191b may be about 1 to 3 times greater than the height of the first subpixel electrode 191a.

The shape of each of the first subpixel electrode 191a and the second subpixel electrode 191b is a quadrangle. Each of the first subpixel electrode 191a and the second subpixel electrode 191b includes a cross stem. The cross stem includes horizontal stems 193a and 193b, and vertical stems 192a and 192b crossing the horizontal stems 193a and 193b. The first subpixel electrode 191a includes a plurality of minute branches 194a and a lower protrusion 197a. The second subpixel electrode 191b includes a plurality of minute branches 194b and an upper protrusion 197b.

The pixel electrode 191 is divided into four subregions by the horizontal stems 193a and 193b and the vertical stems 192a and 192b. The minute branches 194a and 194b extend obliquely from the horizontal stems 193a and 193b and the vertical stems 192a and 192b. The extending directions of the minute branches 194a and 194b may form an angle of about 45 degrees or 135 degrees with the gate lines 121a and 121b or with the horizontal stems 193a and 193b. The extending directions of the minute branches 194a and 194b of two adjacent subregions may also be perpendicular to each other.

In some embodiments, the first subpixel electrode 191a further includes an outer stem surrounding an outer portion The second subpixel electrode 191b further includes horizontal portions positioned at the top and the bottom portions of the first subpixel electrode 191a, and left and right vertical portions 198 positioned at the left and the right portions of the first subpixel electrode 191a. The left and right vertical portions 198 may prevent capacitive coupling that may occur between the data line 171 and the first subpixel electrode 191a.

The lower alignment layer 11, the microcavity 400, the upper alignment layer 21, the common electrode 270, the overcoat 250, and the capping layer 280 are formed on or above the pixel electrode 191. The aforementioned elements are the same as those described above in FIGS. 2 and 3, and further description of these elements shall be omitted.

The liquid crystal display embodiment described above is an example of a visibility structure that allows side visibility to be improved. The structure of the thin film transistor and the design of the pixel electrode are not limited to the structure described in the above embodiment, and may be modified accordingly within the spirit and scope of the inventive concept.

Next, an exemplary method of manufacturing the above liquid crystal display embodiment will be described with reference to FIGS. 5 to 14. FIGS. 5, 7, 9, and 13 illustrate cross-sectional views taken along line II-II of FIG. 1 at different stages of fabrication of the liquid crystal display, and FIGS. 6, 8, 10, 11, 12, and 14 illustrate cross-sectional views taken along line III-III of FIG. 1 at different stages of fabrication of the liquid crystal display.

Figure 5:
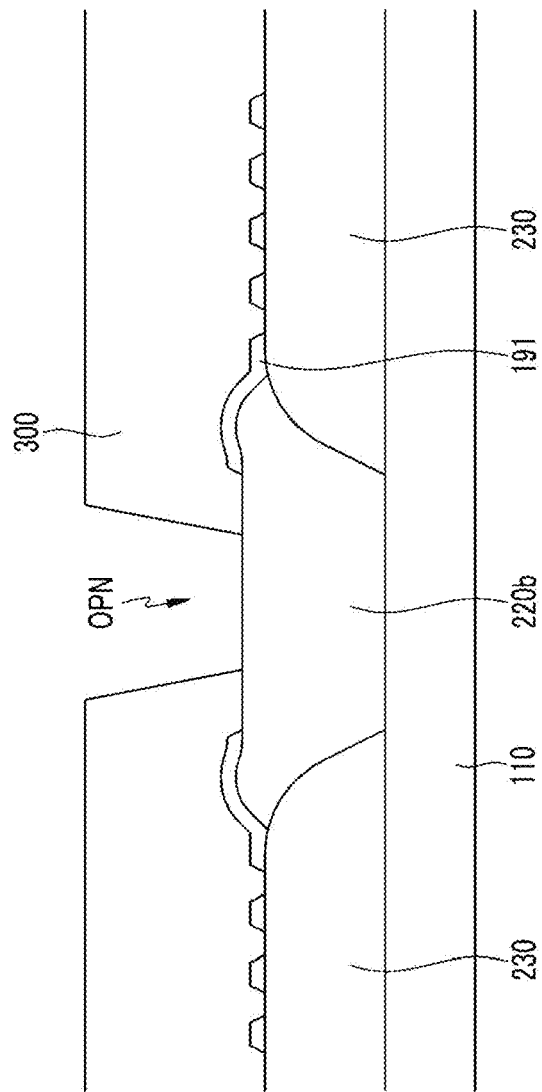
FIGS. 5 to 14 are cross-sectional views illustrating a method of manufacturing a liquid crystal display according to an exemplary embodiment of the inventive concept.
Figure 6:
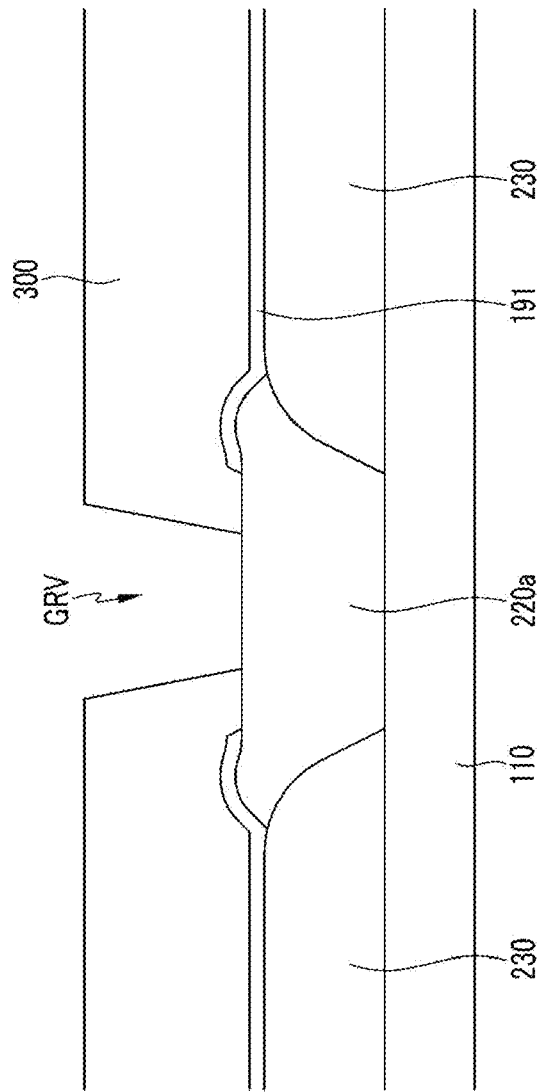

Referring to FIGS. 5 and 6, thin film transistors Qa, Qb, and Qc (see, e.g., FIG. 1) are formed on a substrate 110. The substrate 110 may be formed of transparent glass or plastic. An organic layer 230 is formed on portions of the substrate 110 (where the thin film transistors Qa, Qb, and Qc are formed), with each portion corresponding to a pixel area. A light blocking member 220 (e.g., horizontal light blocking member 220a and vertical light blocking member 220b) is formed on the substrate 110 between adjacent organic layers 230.

Next, a pixel electrode 191 (having minute branches) is formed on portions of the organic layer 230 and the light blocking member 220. The pixel electrode 191 may be formed of a transparent conductor such as ITO or IZO.

Next, a sacrificial layer 300 is formed on the pixel electrode 191. In some embodiments, the sacrificial layer 300 may be formed of silicon oxycarbide (SiOC), a photoresist, or an organic material. In some embodiments, a sacrificial layer 300 including silicon oxycarbide (SiOC) may be formed using a chemical vapor deposition method. In some other embodiments, a sacrificial layer 300 including a photoresist may be formed using a coating method. The sacrificial layer 300 is patterned to form a groove GRV in a direction substantially parallel to a signal line that is connected to a terminal of a thin film transistor. The sacrificial layer 300 is also patterned to form an opening OPN in a substantially vertical direction that is perpendicular to the groove GRV.

Figure 7:
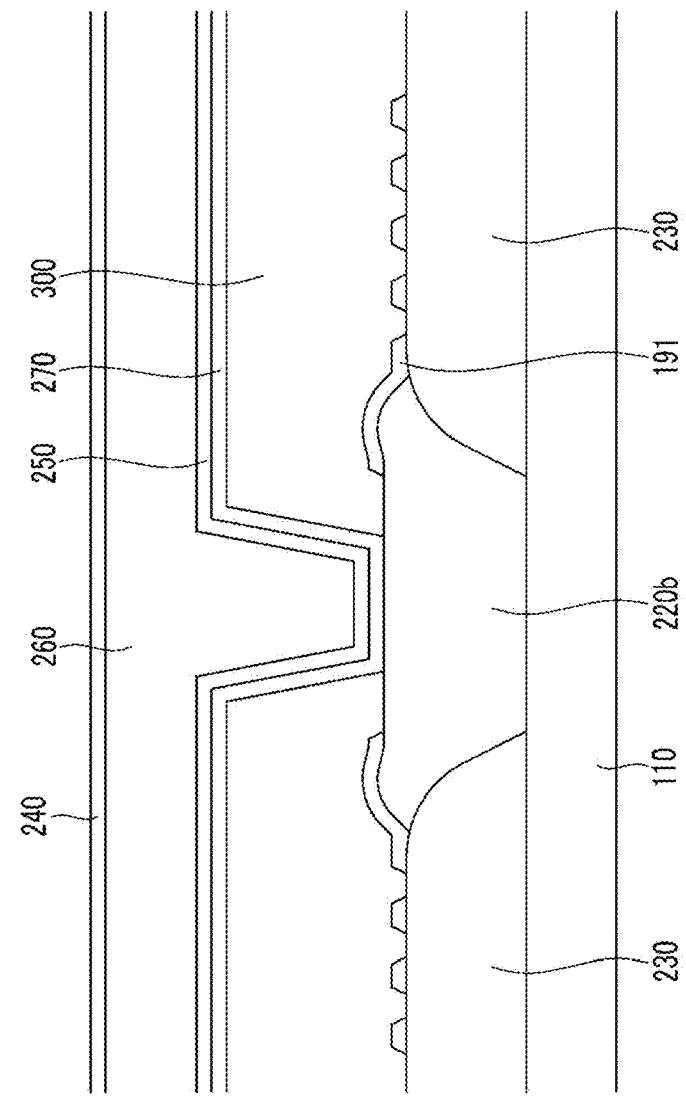
Figure 8:
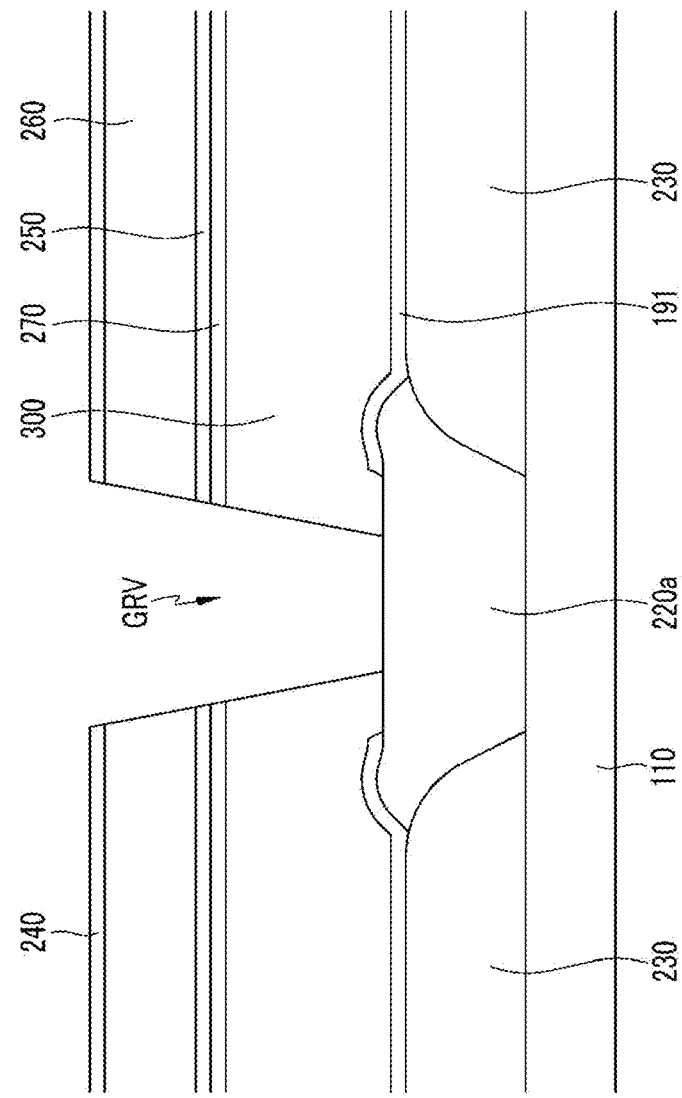

Referring to FIGS. 7 and 8, the common electrode 270, the overcoat 250, and the supporting member 260 are sequentially formed on the sacrificial layer 300.

The common electrode 270 may be formed of a transparent conductor such as ITO or IZO. The overcoat 250 may be formed of silicon nitride (SiNx) or silicon oxide (SiO2). In some embodiments, the supporting member 260 may be formed of a material that is different from the sacrificial layer 300.

The common electrode 270, overcoat 250, and supporting member 260 may be formed on or above the sacrificial layer 300 to completely fill the opening OPN. Next, as shown in FIG. 8, portions of the common electrode 270, overcoat 250, and supporting member 260 above the horizontal light blocking member 220a may be removed to form a groove GRV. The groove GRV provides a passage for removing the sacrificial layer 300 to form a microcavity 400 (shown in FIG. 9).

Figure 9:
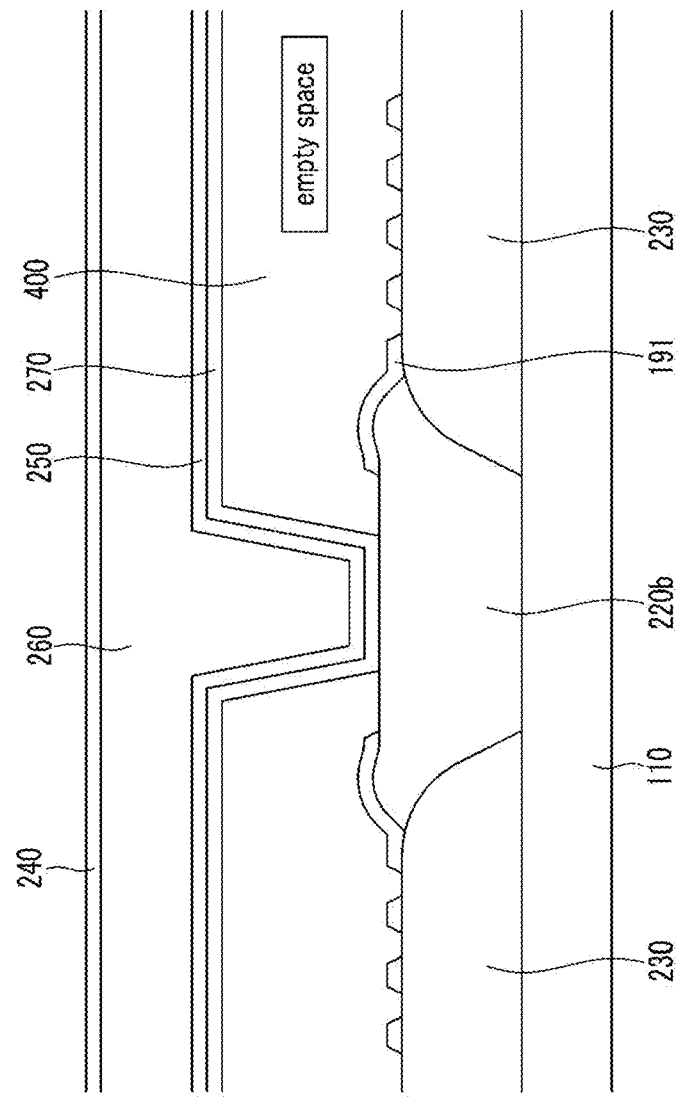
Figure 10:
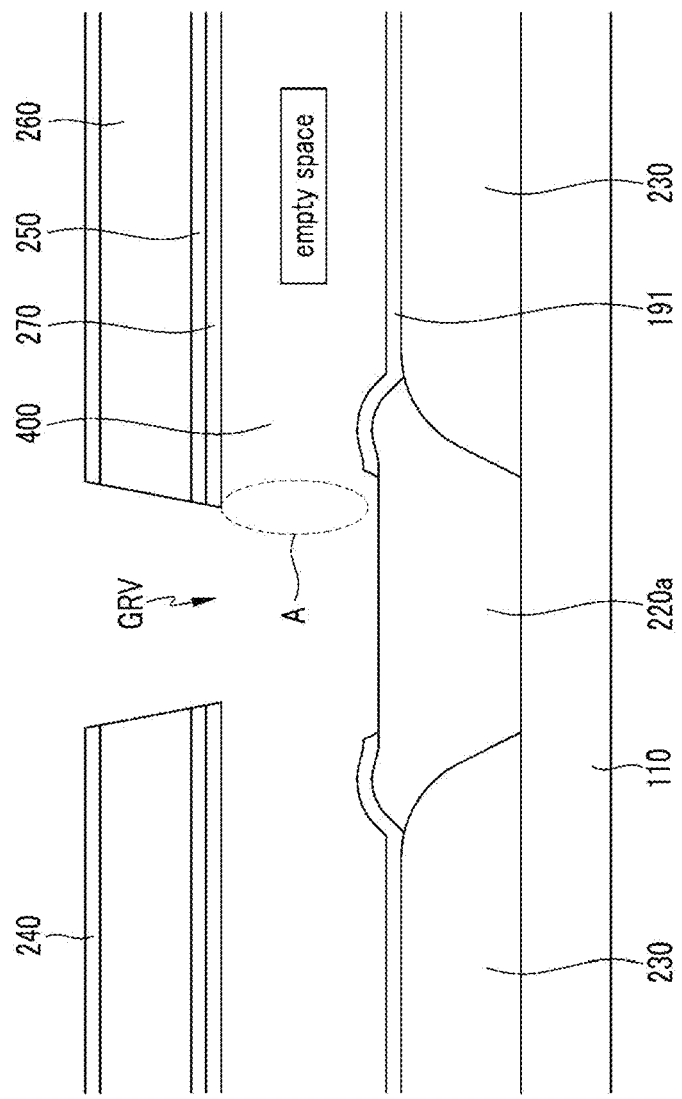

Referring to FIGS. 9 and 10, the sacrificial layer 300 in FIGS. 7 and 8 is removed. The sacrificial layer 300 may be removed using $O_2$ ashing or a wet-etching method. The removal of the sacrificial layer 300 results in a microcavity 400 having a liquid crystal injection hole A formed at an edge of the microcavity 400. The microcavity 400 is an empty space that is formed as a result of removing the sacrificial layer 300. The liquid crystal injection hole A may be formed in a direction parallel to a signal line that is connected to a terminal of the thin film transistor.

Figure 11:
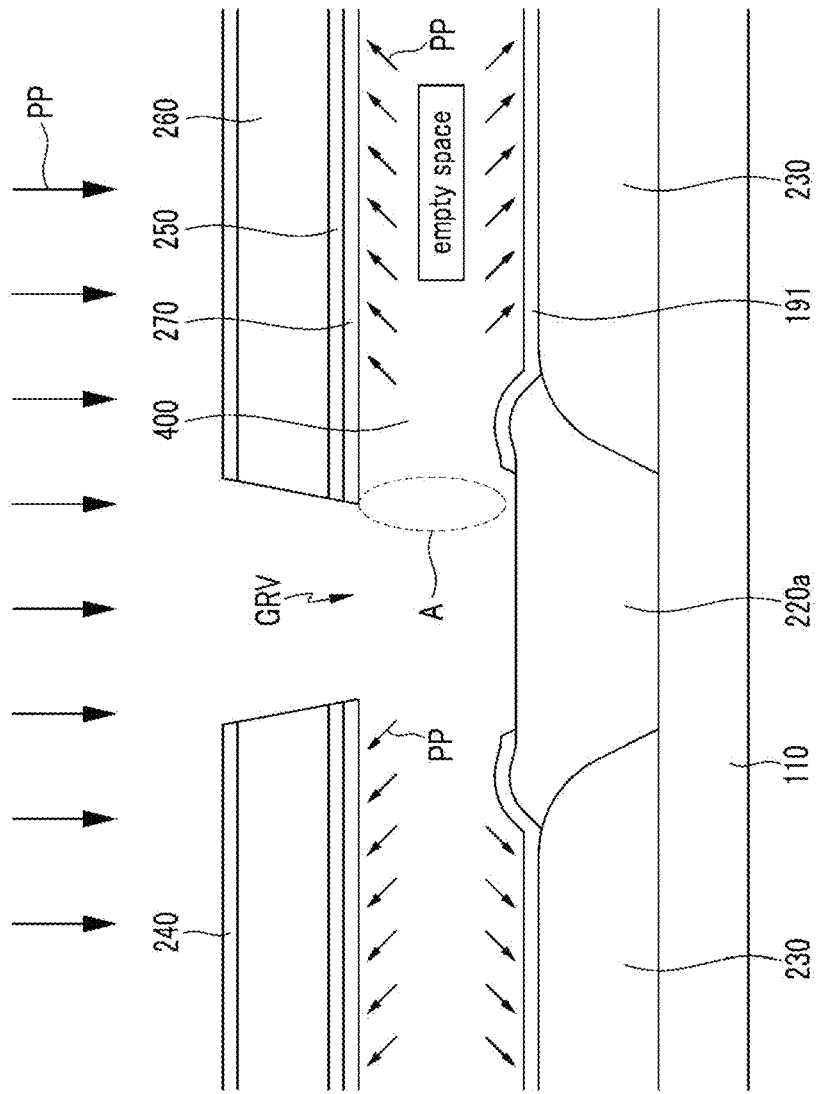

Referring to FIG. 11, plasma processing ("PP") is performed on the microcavity 400. The surface of the pixel electrode 191 and the surface of the common electrode 270 within the microcavity 400 may have a hydrophilic property after the plasma processing PP. The plasma processing PP includes oxygen plasma, which may be obtained from gases such as $O_2$, $O_3$, NO, $N_2O$, CO, or $CO_2$. A processing pressure during the plasma processing PP may range from about $10^{-3}$ torr to 10 torr, and a processing temperature may range from about −20° C. to 80° C. Further, an inflow amount of injected gas may range from about 10 sccm (standard cubic centimeter per minute) to 10,000 sccm.

During subsequent processing, when an alignment material is injected into the groove GRV, the alignment material may enter the microcavity 400 through the liquid crystal injection hole A via capillary action (capillary force). As previously mentioned, after the alignment material is dispensed (or injected), the alignment material typically requires a drying step to drive out the solvents in the alignment material. However, after drying of the alignment material, the solids in the alignment material may coalesce to form large clusters of solids. The large clusters of solids can obstruct the flow of the liquid crystal material into the liquid crystal injection hole A and the microcavity 400. However, if an inner wall of the microcavity 400 has a hydrophilic property, the solids in the alignment material can be dispersed without coalescing together after the drying of the alignment material.

By performing the plasma processing PP, the inner wall of the microcavity 400 may have a hydrophilic property, and the surfaces of the supporting member 260 or the passivation layer 240 may also have a hydrophilic property. As mentioned above, the hydrophilic property of these surfaces allows solids to be dispersed and prevents the solids from coalescing together after the drying of the alignment material. Accordingly, the risk of solids obstructing the flow of liquid crystal material into the liquid crystal injection hole A and microcavity 400 can be reduced in the above embodiments.

Figure 12:
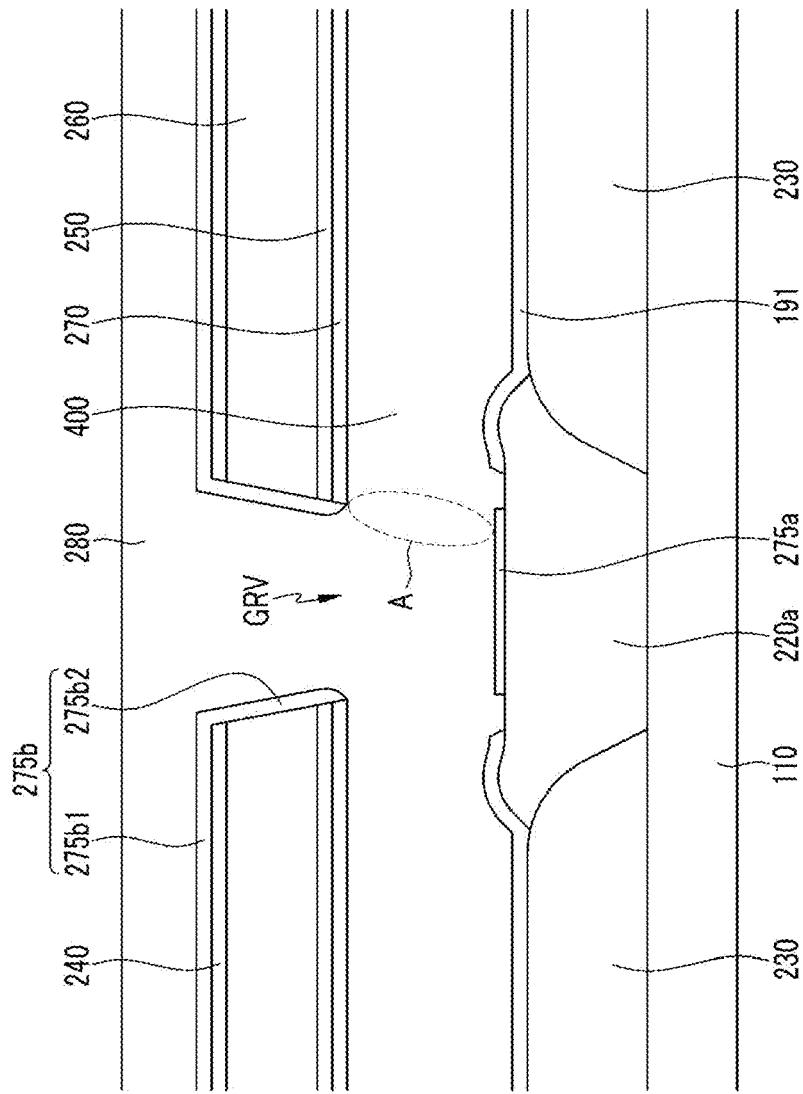

Referring to FIG. 12, a first hydrophobic layer 275a is formed on a portion of the horizontal light blocking member 220a between the adjacent microcavities 400. A second hydrophobic layer 275b is formed on the passivation layer 240 and a side portion of the supporting member 260. The second hydrophobic layer 275b may include a first portion 275b1 formed above a top surface of the supporting member 260, and a second portion 275b2 extending from the first portion 275b1, with the second portion 275b2 formed on a side surface of the supporting member 260 along the side of the groove GRV.

The first hydrophobic layer 275a and the second hydrophobic layer 275b may include elements such as carbon, hydrogen, or fluorine, and may be formed using a chemical vapor deposition method or a sputtering method. When the first hydrophobic layer 275a and the second hydrophobic layer 275b are formed using a sputtering method, a processing pressure may range from about $10^{-2}$ torr to 10 torr, a processing temperature may range from about 20° C. to 300° C., and an inflow amount of injected gas may range from about 10 sccm (standard cubic centimeter per minute) to 10,000 sccm.

The first hydrophobic layer 275a and the second hydrophobic layer 275b can prevent liquid crystal material from dispersing when the liquid crystal material is first dispensed (or injected) onto the groove GRV. A hydrophobic property of the first hydrophobic layer 275a and the second hydrophobic layer 275b also allows the liquid crystal molecules 310 in the liquid crystal material to maintain their original shapes when the liquid crystal material is flowing on the first hydrophobic layer 275a and/or the second hydrophobic layer 275b.

Figure 13:
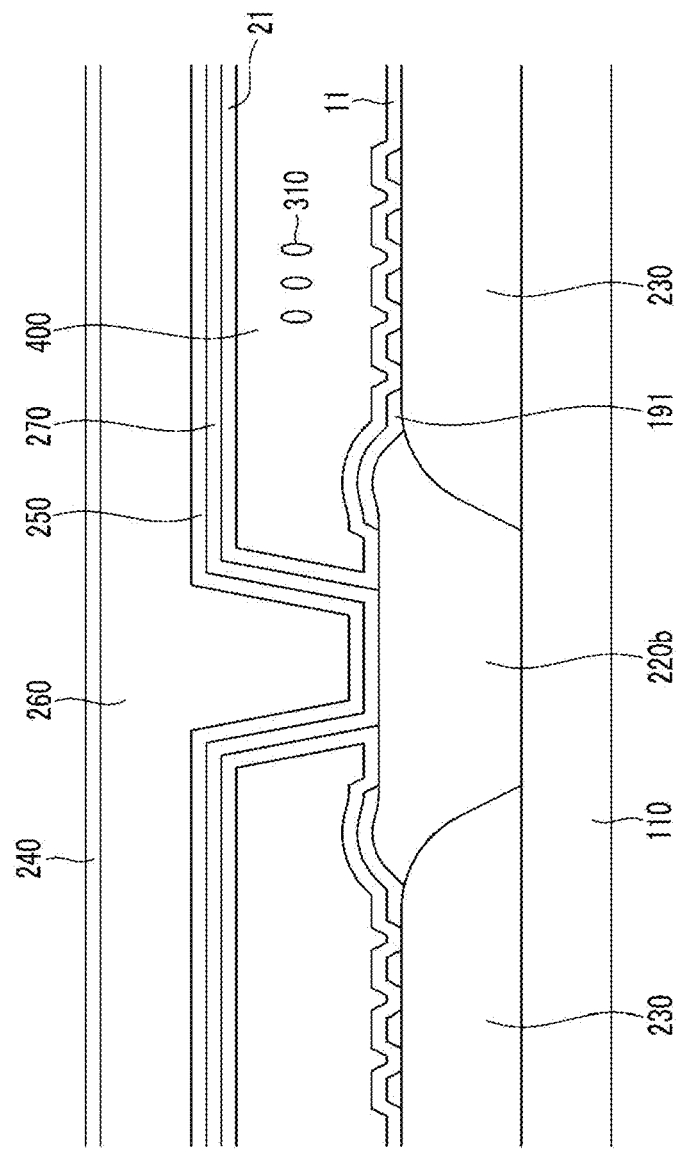
Figure 14:
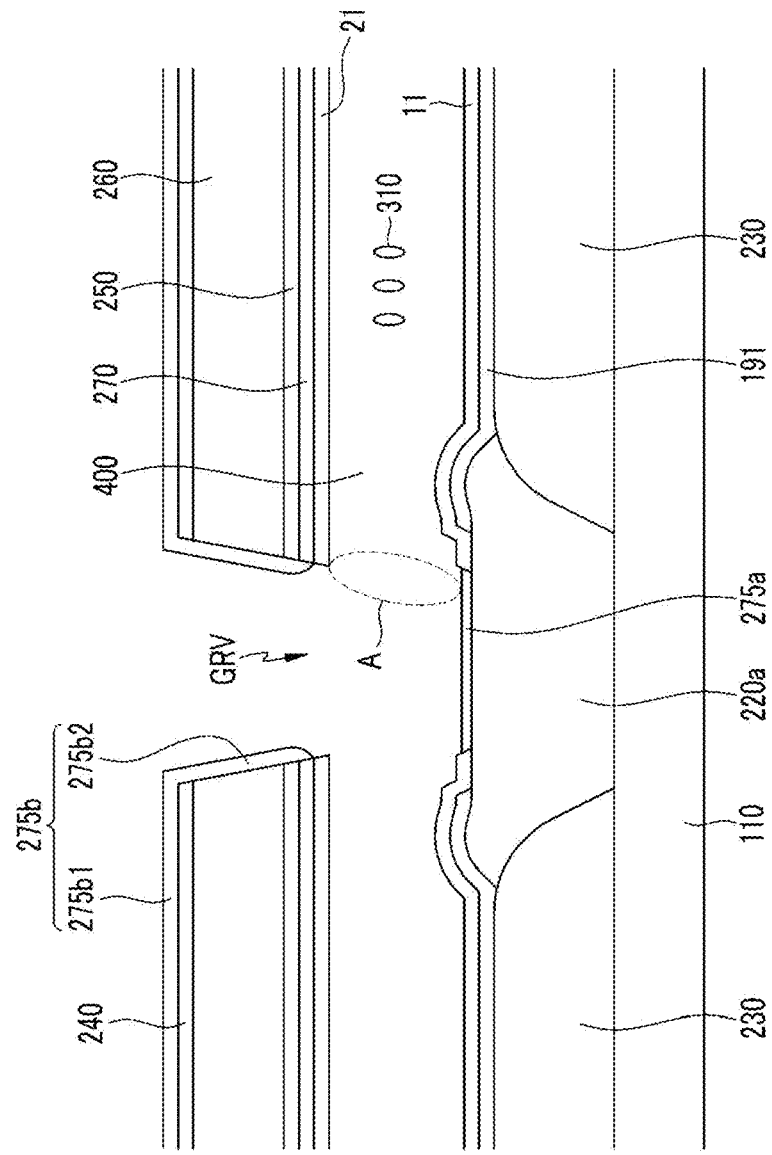

Referring to FIGS. 13 and 14, alignment layers 11 and 21 are respectively formed on the pixel electrode 191 and the common electrode 270 by dispensing (injecting) an alignment material onto the groove GRV, into the liquid crystal injection hole A and microcavity 400. After the alignment material is injected, the alignment material flows through the liquid crystal injection hole A into the microcavity 400 via capillary action (capillary force). In some embodiments, the alignment layers 11 and 21 are formed after the hydrophobic layers 275a and 275b have been formed. In yet other embodiments, the hydrophobic layers 275a and 275b are formed after plasma processing PP, and after the alignment layers 11 and 21 have been formed.

As previously mentioned, the dispensed liquid crystal material (including the liquid crystal molecules 310) can flow into the microcavity 400 via capillary action (capillary force) through the groove GRV and the liquid crystal injection hole A. Since the first hydrophobic layer 275a is formed in a region adjacent to the liquid crystal injection hole A, the liquid crystal material is not dispersed when the liquid crystal material is dispensed (or injected) onto the groove GRV. Also, as previously mentioned, a hydrophobic property of the first hydrophobic layer 275a allows the liquid crystal molecules 310 in the liquid crystal material to maintain their original shapes when the liquid crystal material is flowing on the first hydrophobic layer 275a. The second hydrophobic layer 275b is formed above a top surface of the supporting member 260 and located near the groove GRV. Accordingly, even if misalignment occurs during the dispense of the liquid crystal material, the second hydrophobic layer 275b may still guide the liquid crystal material toward the liquid crystal injection hole A, while maintaining the original shape of the liquid crystal molecules 310 as the liquid crystal material is flowing on the second hydrophobic layer 275b.

Next, a capping layer 280 is formed to cover the liquid crystal injection hole A according to the embodiments described in FIGS. 2 and 3. The capping layer 280 covers the top and the side walls of the supporting member 260, and also covers the liquid crystal injection hole A being exposed by the groove GRV. The first hydrophobic layer 275a and the capping layer 280 may be formed in contact with each other in the groove GRV. As previously mentioned, the capping layer 280 may be formed of a thermosetting resin, silicon oxycarbide (SiOC), or graphene.

While the inventive concept has been described with reference to some embodiments, it is to be understood that the inventive concept is not limited to the disclosed embodiments, and is intended to cover various modifications and equivalent arrangements within the spirit and scope of the inventive concept.

What is claimed is:

1. A liquid crystal display, comprising:
a substrate;
a thin film transistor disposed on the substrate;
a pixel electrode connected with a terminal of the thin film transistor;
a supporting member facing the pixel electrode;
a liquid crystal layer disposed in a plurality of microcavities between the pixel electrode and the supporting member;
an upper hydrophobic layer disposed on an edge portion of the supporting member and on the supporting member which is disposed on the liquid crystal layer;
a lower hydrophobic layer disposed between adjacent microcavities and in a region corresponding to a groove; and
a capping layer disposed on the supporting member
wherein an overlapping area of the lower hydrophobic layer and the pixel electrode is smaller than both a surface area of the lower hydrophobic layer facing the substrate and a surface area of the pixel electrode facing the substrate.

2. The liquid crystal display of claim 1, wherein:
the capping layer covers the groove.

3. The liquid crystal display of claim 2, wherein:
the lower hydrophobic layer and the capping layer are disposed in contact with each other in the groove.

4. The liquid crystal display of claim 3, wherein:
the upper hydrophobic layer includes a first portion disposed at a top surface of the supporting member and a second portion extending from the first portion, with the second portion disposed on a surface of the supporting member along a lateral surface of the groove.

5. The liquid crystal display of claim 4, further comprising:
an organic layer disposed on portions of the substrate; and
a light blocking member disposed between adjacent organic layers,
wherein the lower hydrophobic layer is disposed on a portion of the light blocking member.

6. The liquid crystal display of claim 1, further comprising:
a common electrode disposed between the liquid crystal layer and the supporting member.

7. The liquid crystal display of claim 6, wherein:
a surface of the pixel electrode facing the liquid crystal layer and a surface of the common electrode facing the liquid crystal layer have a hydrophilic property as a result of being subjected to hydrophilic processing.

8. The liquid crystal display of claim 7, further comprising:
an alignment layer disposed between the pixel electrode and the liquid crystal layer, or between the common electrode and the liquid crystal layer.

9. The liquid crystal display of claim 1, wherein:
the upper hydrophobic layer includes carbon, hydrogen, or fluorine.

* * * * *